Patented Dec. 5, 1944

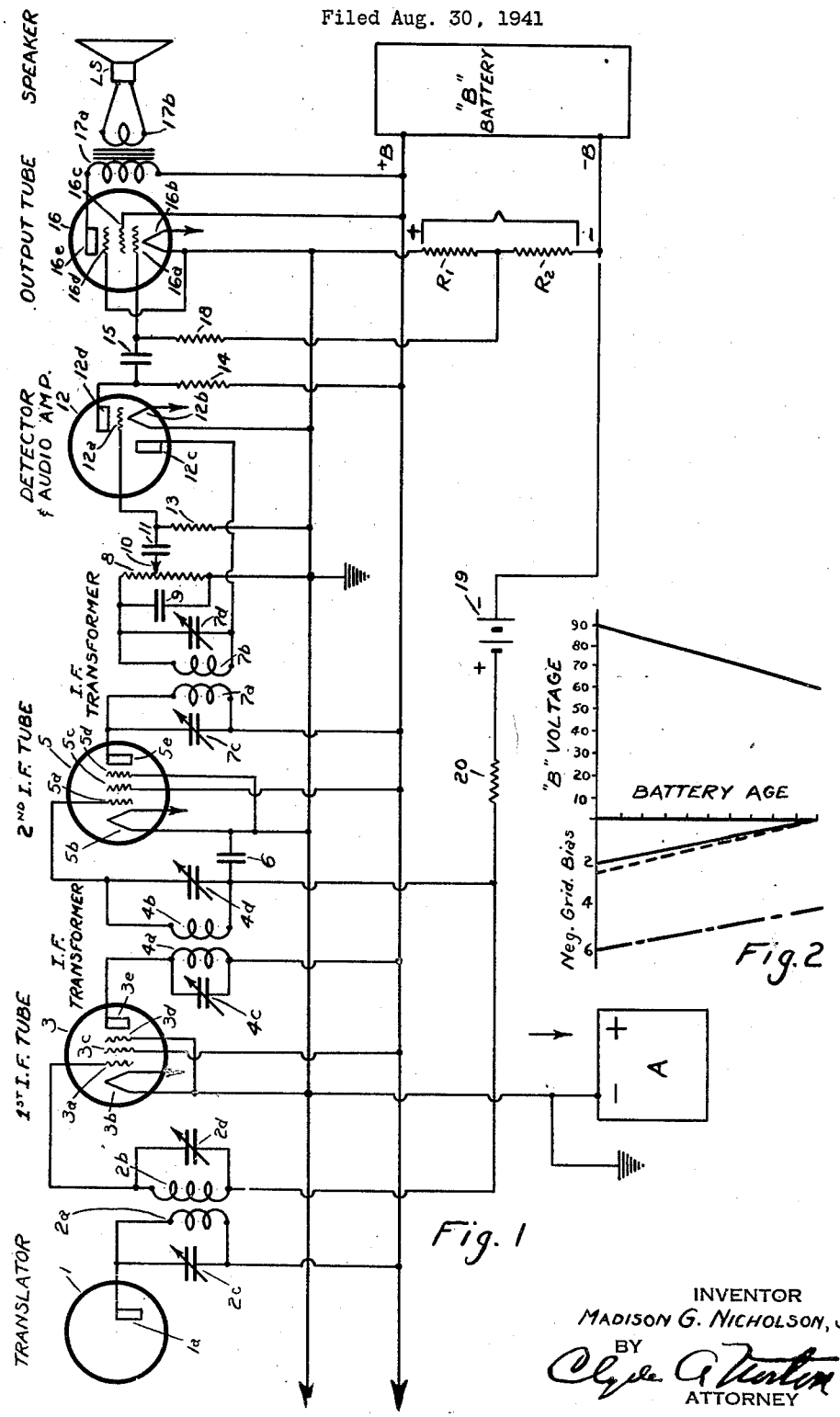

2,364,238

UNITED STATES PATENT OFFICE 2,364,238

BATTERY RADIO RECEIVER

Madison G. Nicholson, Jr., Verona, N. J., assignor, by mesne assignments, to Sears, Roebuck and Co., Chicago, Ill., a corporation of New York Application August 30, 1941, Serial No. 409,078

5 Claims. (Cl. 250—20)

This invention relates to improvements in battery receivers and more particularly, to apparatus so arranged and connected as to maintain the overall gain of the receiver substantially constant regardless of the condition of the batteries which are used to operate the receiver.

It is well known that the A and B batteries ordinarily used for operating portable receivers progressively decrease in the voltage which they will supply, with the amount of use and age of the batteries. This drop in voltage causes a reduction in the amount of plate current drawn by the various tubes and reduces the gain of each tube to some extent. This results in an extreme loss of sensitivity of the receiver when the batteries have suffered any substantial loss of voltage.

It is an object of this invention to provide a circuit which will automatically compensate for loss of voltage of the batteries so as to maintain the gain of the receiver substantially constant even though the batteries may be approaching or almost at the point of exhaustion.

It is a further object of this invention to provide a circuit in which the sensitivity of the receiver will remain substantially constant independent of the condition of the batteries, short of complete exhaustion.

It is a further object of this invention to provide a circuit embodying the above mentioned advantages at very little or substantially no increase in cost of construction or operation.

Still other objects and advantages of my invention will be apparent from the specification.

In this application I have particularly pointed out and distinctly claimed the part, improvement, or combination which I claim as my invention or discovery, and I have explained the principles thereof and the best mode in which I have contemplated applying those principles, so as to distinguish my invention from other inventions.

In the drawing:

Figure 1 is a circuit diagram of a radio receiver or so much thereof as is necessary to show the application of my invention thereto, and Figure 2 are curves illustrating the operation of my invention.

Referring now more particularly to the drawing, 1 indicates diagrammatically the translator tube of a superheterodyne receiver. Since the arrangement of the receiver up to the point of the anode $1a$ of the translator tube 1 is well known in the art and forms per se no part of this invention, the same is not described or shown, it being believed sufficient to state that the anode $1a$ is connected through the primary winding $2a$ to B+.

The winding $2a$ constitutes the primary of the first intermediate frequency transformer, the secondary $2b$ of which may be connected at one end thereof to the control electrode or grid $3a$ of the first intermediate frequency amplifier tube 3. The opposite terminal of the winding $2b$ may be connected through resistance 20, and biasing battery 19, to the negative terminal of the B battery. The primary and secondary windings $2a$ and $2b$ may be tuned by condensers $2c$ and $2d$ respectively.

The tube 3 may be a pentode having a filamentary cathode $3b$, screen and suppressor electrodes $3c$ and $3d$ connected in the usual manner, and anode $3e$ connected through the primary winding $4a$ of the second intermediate frequency transformer to B+. The secondary winding of the said transformer $4b$ may be connected at one terminal to the control electrode or grid $5a$ of tube 5, and at its other terminal through condenser 6 to one side of the filament or cathode $5b$ of the second intermediate frequency tube 5. The primary and secondary windings $4a$ and $4b$ may be tuned respectively by condensers $4c$ and $4d$.

Tube 5 may also comprise screen and suppressor electrodes $5c$ and $5d$ connected in the usual manner, and anode $5e$ connected through primary $7a$ of the third intermediate frequency transformer to B+. The secondary $7b$ of the said transformer may be connected on one end to resistor 8, shunted by condenser 9, and the opposite terminal of resistor 8 may be grounded. The primary and secondary windings $7a$ and $7b$ may be tuned respectively by condensers $7c$ and $7d$. The low potential side of the winding $7b$ may be connected to the diode-anode $12c$ of diode-triode tube 12 having filamentary cathode $12b$, diode-anode $12c$, control electrode or grid $12a$, and triode-anode $12d$. The grid $12a$ may be connected through condenser 11 to a variable point on resistor 8 as determined by slider 10, and resistor 13 may be connected between grid $12a$ and ground.

As will be readily understood, this circuit connected with the tube 12 operates both as a detector or rectifier and as an audio-frequency amplifier, so that the currents delivered by the triode-anode $12d$ are audio-frequency. The anode $12d$ may be connected through resistor 14 to B+ and through condenser 15 to the control grid $16a$ of the output tube 16, which may have filamentary cathode $16b$, screen grid $16c$, suppressor $16d$, and anode $16e$. The filament or cathode $16b$ of the tube 16 may be connected through resistance R1 and R2 in series to B— and the anode 16e through the primary winding 17a of the output transformer to B+. The secondary winding 17b may be connected to a suitable loud speaker LS.

Resistor 18 may be connected from grid 16a to the common point of resistors R1 and R2. One side of each of the filaments 3b, 5b, 12b, and 16b may be connected together to the negative side of the A battery and to ground. The other terminal of the filaments may be connected to A+ as indicated by the arrows, although the actual wire connection has been omitted for simplicity in the drawing.

It is usually desirable in the practice of this invention to operate tubes 3 and 5 with an over-bias on the grid for full plate voltage. This provides a reserve of gain in these tubes which may be employed to compensate for loss of gain in the other tubes when the B voltage falls off. By gradually reducing the bias on tubes 3 and 5, their gain may be increased to compensate for the loss of gain in the other tubes and to keep the overall gain of the receiver substantially constant, in spite of the fall of B voltage. Under these conditions the total plate current supplied by the B battery may be from 12 to 14 milliamperes. These tubes may for example be type 1P5GT and may be chosen to have maximum gain for zero bias voltage, and may be operated with a negative bias of 2.5 volts when the plate voltage is 90 volts. The total plate current supplied by the B battery, it will be observed, flows through R1 and R2 in a direction to make the lower terminal of R2 negative with respect to the upper terminal of R1 and the voltage drop through these resistances, may be applied to the control grids of the tubes 3 and 5 as a negative grid bias. This voltage is dependent upon the magnitude of R2 among other things, and for all values of R2 which would ordinarily be employed, the negative grid bias impressed upon the tubes 3 and 5 is directly proportional to R1+R2, and varies with variation of R2, other things remaining constant. It will, therefore, be understood that the value of R2 might be so chosen as to apply on the tubes 3 and 5 the value of negative grid bias voltage to secure the desired gain for any given voltage of the B battery.

If the B battery voltage changes; for example, suppose it to decrease as the battery grows old, the plate current will be reduced proportional to the reduction of B battery voltage and the grid bias voltage developed across R2 will be proportionately reduced. This, however, results in a decrease in gain of the receiver, because in order to maintain the gain substantially constant with decreasing B voltage, the grid bias voltage should be reduced (move in a positive direction) at a rate greater than proportional to the B battery voltage drop.

I am able to produce this result by interposing between the B— terminal and the control electrodes 3a and 5a of the tubes 3 and 5 a biasing battery 19 and properly relating the voltage of this battery to the voltage drop through resistance R2. In order to protect the battery 19 against excessive current discharge in the event that grids 3a and 5a should draw current, I may also interpose in series with the battery 19 a resistance 20 which may have a relatively high value; such as one megohm. Battery 19, it will be noted, is poled in such a way as to oppose the voltage developed through resistance R1 and R2; that is to say, whereas R1 and R2 tends to make the grids negative with respect to their cathodes, battery 19 tends to make them positive.

Assuming now that the B battery, when fresh, has a potential of 90 volts, and when approaching exhaustion, a potential of 60 volts, and assuming that, for constant overall gain of the receiver over this range of B voltage, the negative grid bias should be about —2.5 volts with 90 volts B battery, decreasing to about zero volts grid bias for 60 volts B battery, this condition may be readily obtained by properly relating the value of resistance R2 to the voltage of the battery 19. Under the conditions above indicated, R2 should have a value such as to develop a potential difference of about 6 volts across its terminals for normal plate current when the B battery is at 90 volts, and should produce a value of about 4 volts when the B battery drops to 60 volts. If the potential of battery 19 is 4 volts positive, this will give an effective negative bias of 2 volts on the grids of tubes 3 and 5 when the B battery is 90 volts, and zero bias when the B battery is at 60 volts, which is a sufficiently close approximation to the desired condition to give the desired operating characteristics. This is clearly shown in Figure 2 in which the abscissa represents battery age, the positive ordinate B battery voltage and the negative grid bias voltage. The dotted line (a) represents the desired condition of —2.5 volts negative grid bias at 90 volts B and zero grid bias at 60 volts B. The dot and dash line (b) represents the drop through resistance R2 and the full line (c) the actual grid bias applied through the combination of R2 and battery 19.

It will be noted that the problem is impossible of a simple mathematical solution because of the characteristics of the tubes; but, as will be seen by reference to the figure, a very close approximation to the result desired can be obtained. It will be seen that by increasing the voltage of the battery 19 slightly the exact bias desired may be obtained at any point on the curves, either for the full voltage of the B battery or for its lowest voltage, or for any point in between.

In the example given, the battery 19 might be reduced to 3½ volts, giving an initial bias of —2.5 volts, and a residual bias of —½ volts instead of zero when the B battery is reduced to 60 volts.

It is important in the practice of this invention to use a biasing battery for battery 19, the voltage of which does not drop to any substantial extent during the useful life of the B battery. I find that batteries obtainable on the market under the name "Mallory bias cells" fulfill this condition very well, maintaining their rated voltage indefinitely when no current is drawn from them.

It is to be noted that the application of my invention does not preclude the use of automatic volume control circuits at the same time. For instance, any well-known automatic volume control circuit may be applied to control the bias on any or all of the tubes other than tubes 3 and 5, on which the battery compensating bias may be applied.

While I have given particular values in the above description, it will be understood that these are given merely by way of example to illustrate the principle of operation and that they may be varied to suit the particular tubes employed.

While I have shown and described certain preferred embodiments of my invention, it will be understood that modifications and changes may be made without departing from the spirit and scope of my invention, as will be clear to those skilled in the art.

I claim:

1. Radio receiving apparatus comprising, in combination, a plurality of vacuum tubes including at least one radio frequency amplifier each having a control electrode and an anode, connected in cascade, a battery source for supplying B voltage connected to the anodes of said tubes, a resistance in series with said battery source, a direct current voltage connection between the negative side of said resistance and the control electrode of said radio frequency amplifier, and a biasing battery included in circuit with said resistance and said control electrode, said biasing battery being poled to oppose the bias impressed on said control electrode by the voltage drop through said resistor, the magnitude of the voltage of said biasing battery impressed on said circuit being less than the voltage drop through said resistance for full voltage of said B voltage source.

2. Radio receiving apparatus comprising, in combination, a plurality of vacuum tubes including at least one radio frequency amplifier each having a control electrode and an anode, connected in cascade, a battery source for supplying B voltage connected to the anodes of said tubes, a resistance in series with said battery source, a direct current voltage connection between the negative side of said resistance and the control electrode of said radio frequency amplifier, and a biasing battery included in circuit with said resistance and said control electrode, said biasing battery being poled to oppose the bias impressed on said control electrode by the voltage drop through said resistor, the voltage of said biasing battery impressed on said circuit being so related to the voltage drop through said resistance that the effective negative bias on at least one of said tubes is decreased to cause the gain of said tube to rise as the B battery voltage drops.

3. Radio receiving apparatus comprising, in combination, a plurality of vacuum tubes including at least one radio frequency amplifier each having a control electrode and an anode, connected in cascade, a battery source for supplying B voltage connected to the anodes of said tubes, a resistance in series with said battery source, a direct current voltage connection between the negative side of said resistance and the control electrode of said radio frequency amplifier, and a biasing battery included in circuit with said resistance and said control electrode, said battery being poled to oppose the bias impressed on said control electrode by the voltage drop through said resistor, the voltage of said biasing battery impressed on said circuit being less than the voltage drop through said resistance and so related thereto that the overall gain of said receiving apparatus remains substantially constant in spite of a substantial drop in the voltage of said B battery.

4. Radio receiving apparatus comprising, in combination, a plurality of vacuum tubes including at least one radio frequency amplifier each having a control electrode and an anode, connected in cascade, a battery source for supplying B voltage connected to the anodes of said tubes, a resistance in series with said battery source, a direct current voltage connection between the negative side of said resistance and the control electrode of said radio frequency amplifier, and and a biasing battery included in circuit with said resistance and said control electrode, said biasing battery being poled to oppose the bias impressed on said control electrode by the voltage drop through said resistor, the voltage of said biasing battery impressed on said circuit being so related thereto that the overall gain of said receiving apparatus remains substantially constant in spite of a substantial drop in the voltage of said B battery.

5. Radio receiving apparatus comprising in combination, a plurality of vacuum tubes including at least one radio frequency amplifier each having a control electrode and an anode, connected in cascade, a battery source for supplying B voltage connected to the anodes of said tubes, a resistance in series with said battery source, a direct current voltage connection between the negative side of said resistance and the control electrode of said radio frequency amplifier, and a biasing battery included in circuit with said resistance and said control electrode, said biasing battery being poled to oppose the bias impressed on said control electrode by the voltage drop through said resistance, the voltage of said last mentioned battery being so related to the voltage of said B battery, the voltage drop through said resistance, and the operating characteristics of said radio frequency amplifier tube, that said tube is overbiased for reduced gain with full values of voltage of said B battery, with a rising gain characteristic with fall of B voltage.

MADISON G. NICHOLSON, Jr.